US012100224B1

(12) United States Patent
Goel et al.

(10) Patent No.: US 12,100,224 B1
(45) Date of Patent: Sep. 24, 2024

(54) KEY POINT DETECTION

(71) Applicant: Zoox, Inc., Foster City, CA (US)

(72) Inventors: Kratarth Goel, Albany, CA (US); Vasiliy Karasev, San Francisco, CA (US); Sarah Tariq, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 643 days.

(21) Appl. No.: 17/246,016

(22) Filed: Apr. 30, 2021

Related U.S. Application Data

(60) Provisional application No. 63/117,263, filed on Nov. 23, 2020, provisional application No. 63/028,377, filed on May 21, 2020.

(51) Int. Cl.
*G06V 20/00* (2022.01)
*G06N 20/00* (2019.01)
*G06V 10/46* (2022.01)
*G06V 20/58* (2022.01)
*G06V 40/10* (2022.01)

(52) U.S. Cl.
CPC .............. *G06V 20/58* (2022.01); *G06N 20/00* (2019.01); *G06V 10/462* (2022.01); *G06V 40/10* (2022.01)

(58) Field of Classification Search
CPC ...... G06V 20/58; G06V 10/462; G06V 40/10; G06N 20/00
See application file for complete search history.

(56) References Cited

U.S. PATENT DOCUMENTS

| 10,967,824 | B1 * | 4/2021 | Pertsel | B60R 21/01538 |
| 11,048,927 | B2 * | 6/2021 | Russell | G05D 1/0088 |
| 11,074,438 | B2 * | 7/2021 | Mangalam | G06V 40/103 |
| 11,138,446 | B2 * | 10/2021 | Kim | B60W 30/0956 |
| 11,167,756 | B2 * | 11/2021 | Shalev-Shwartz | B60W 50/14 |
| 11,226,626 | B1 | 1/2022 | Silver | |
| 11,420,855 | B2 * | 8/2022 | Ishizaki | G06V 40/10 |

(Continued)

FOREIGN PATENT DOCUMENTS

| CN | 110858295 B | 4/2021 |
| CN | 113453970 | 9/2021 |

OTHER PUBLICATIONS

Office Action for U.S. Appl. No. 17/320,678, mailed on Oct. 31, 2023, Oytun Ulutan, "Pedestrian Attribute and Gesture Detection", 18 pages.

(Continued)

*Primary Examiner* — Van D Huynh

(74) *Attorney, Agent, or Firm* — Lee & Hayes, P.C.

(57) ABSTRACT

Techniques for detecting key points associated with objects in an environment are described herein. The techniques may include receiving sensor data representing a portion of an environment in which the vehicle is operating and inputting the sensor data into a machine-learned model. Based on the input sensor data, the machine-learned model may detect one or more key points corresponding to physical features (e.g., hands, feet, eyes, etc.) of a pedestrian who is in the environment. Based on the one or more key points, a bounding box associated with the pedestrian may be generated and the vehicle may be controlled based on at least one of the key points or the bounding box. The techniques may also include training the machine-learned model to detect key points associated with pedestrians.

20 Claims, 8 Drawing Sheets

(56) References Cited

U.S. PATENT DOCUMENTS

| | | |
|---|---|---|
| 11,427,195 B1 | 8/2022 | Pertsel et al. |
| 2010/0191391 A1 | 7/2010 | Zeng |
| 2016/0144867 A1 | 5/2016 | Delp |
| 2017/0074000 A1 | 3/2017 | Banvait |
| 2017/0206464 A1 | 7/2017 | Clayton et al. |
| 2019/0049987 A1 | 2/2019 | Djuric et al. |
| 2019/0359208 A1 | 11/2019 | Sapp |
| 2019/0384303 A1 | 12/2019 | Muller et al. |
| 2020/0026286 A1 | 1/2020 | Vozar et al. |
| 2020/0110175 A1* | 4/2020 | Chen ............. G01S 17/89 |
| 2020/0160537 A1 | 5/2020 | Urtasun et al. |
| 2020/0202209 A1 | 6/2020 | Mao |
| 2020/0210721 A1 | 7/2020 | Goel |
| 2020/0250553 A1* | 8/2020 | Tomaru ............. B60R 21/00 |
| 2020/0293064 A1 | 9/2020 | Wu et al. |
| 2020/0307562 A1 | 10/2020 | Ghafarianzadeh et al. |
| 2020/0307563 A1 | 10/2020 | Ghafarianzadeh et al. |
| 2020/0357174 A1 | 11/2020 | Banerjee |
| 2021/0094577 A1 | 4/2021 | Shalev-Shwartz et al. |
| 2021/0245744 A1* | 8/2021 | Mangalam ........ B60W 30/0956 |
| 2021/0271866 A1* | 9/2021 | Hayakawa ............. G06V 20/41 |
| 2021/0304514 A1 | 9/2021 | Croxford et al. |
| 2022/0027642 A1 | 1/2022 | Shambik et al. |
| 2022/0066456 A1 | 3/2022 | Ebrahimi Afrouzi et al. |
| 2022/0171065 A1 | 6/2022 | Li et al. |

OTHER PUBLICATIONS

Office Action for U.S. Appl. No. 17/320,630, mailed on Jul. 27, 2023, Xin Wang, "Vehicle Door State Detection", 42 pages.

Office Action for U.S. Appl. No. 17/320,690, mailed on Aug. 3, 2022, Ultan, "Machine-Learned Model Training for Pedestrian Attribute and Gesture Detection", 26 pages.

Office Action for U.S. Appl. No. 17/320,630, mailed on Dec. 19, 2023, Xin Wang, "Vehicle Door State Detection", 52 pages.

Office Action for U.S. Appl. No. 18/205,651, mailed on Jan. 5, 2024, Oytun Ulutan, "Machine-Learned Model Training for Pedestrian Attribute and Gesture Detection", 20 pages.

* cited by examiner

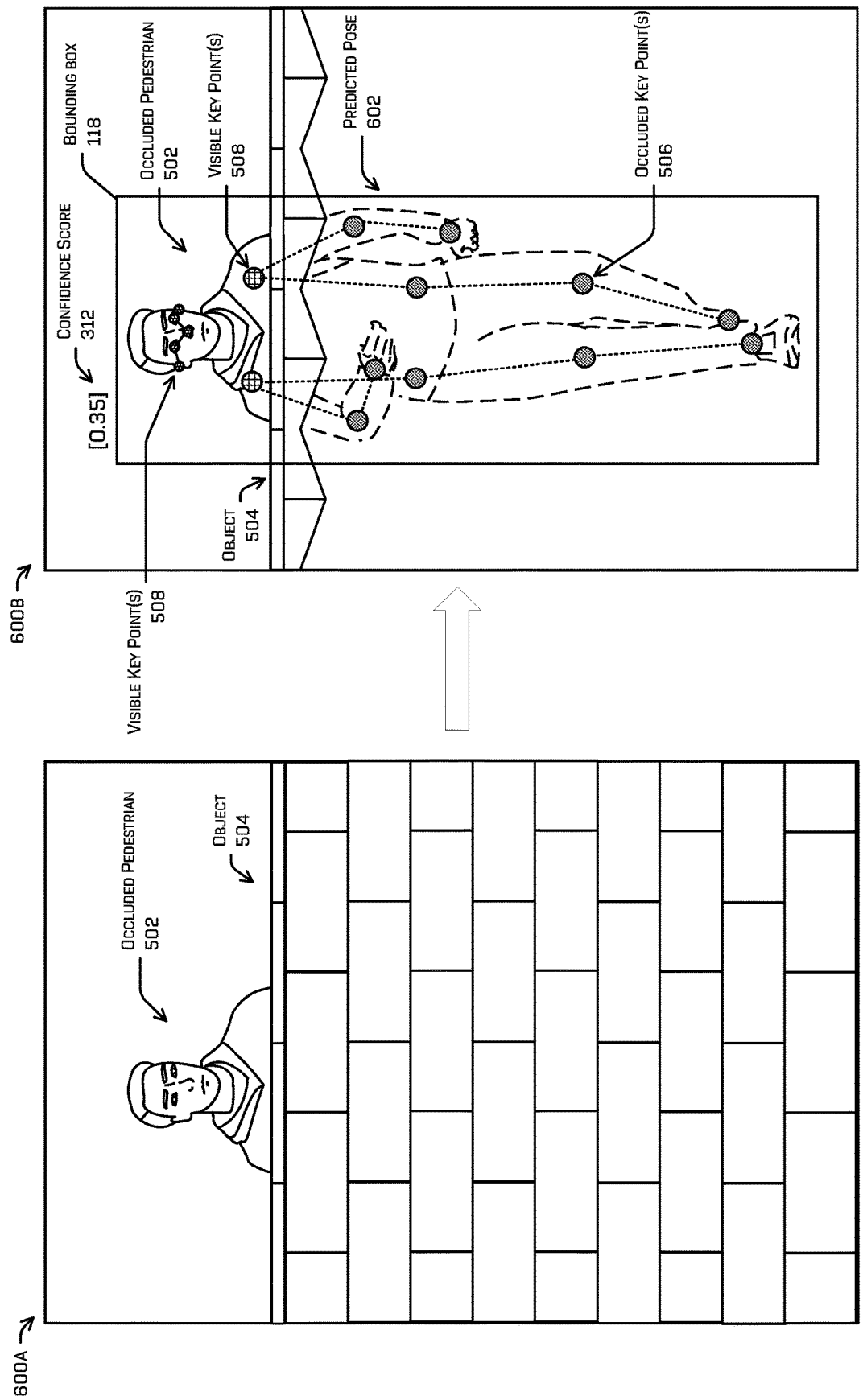

KEY POINT DETECTION

PRIORITY

This application claims priority to U.S. Provisional Application No. 63/028,377, filed May 21, 2020, which is incorporated herein by reference in its entirety and for all purposes. Additionally, this application claims priority to U.S. Provisional Application No. 63/117,263, filed Nov. 23, 2020, which is incorporated herein by reference in its entirety and for all purposes.

BACKGROUND

Computer vision is used in applications such as autonomous vehicle operation, identifying individuals for security purposes, and performing manufacturing and industrial tasks, etc. Computer vision techniques may use sensors to capture data of an environment and use this sensor data to detect and identify objects in the environment. Such techniques may utilize processors and associated memories, including various models, algorithms, and/or machine-learning algorithms to perform object detection and identification. For instance, machine-learned models may be trained to identify and predict characteristics of an object detected in a physical environment based on sensor data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 6A and 6B are example images that collectively illustrate how key points associated with occluded physical features of a pedestrian may be determined.

DETAILED DESCRIPTION

Figure 1:
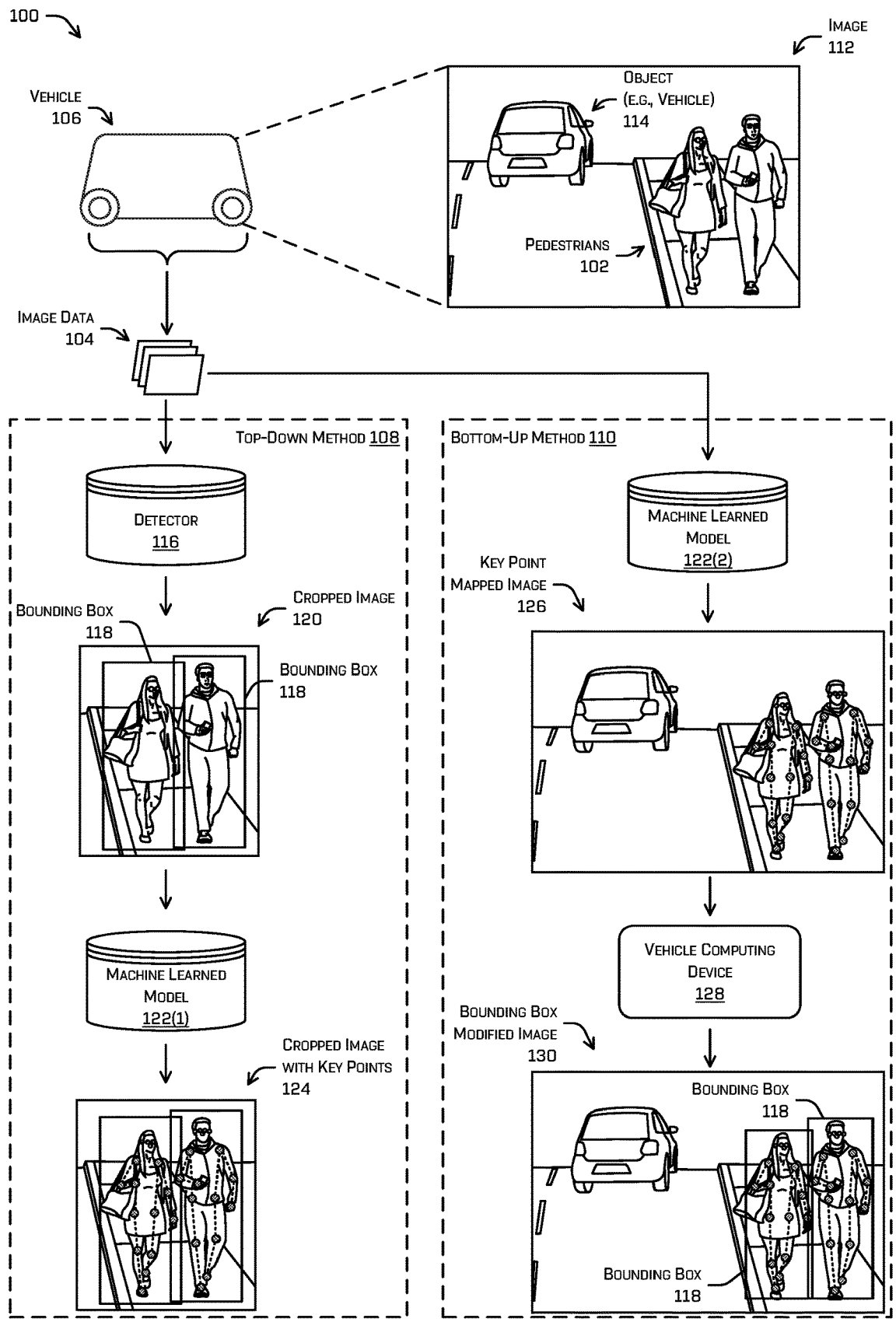
FIG. 1 is a pictorial flow diagram illustrating an example data flow associated with detecting key points corresponding with pedestrians based on image data captured by a vehicle. The key points may be detected using a top-down method or a bottom-up method.

Techniques for detecting key points associated with objects in an environment are described herein. As discussed above, computer vision is used in applications such as autonomous vehicle operation, identifying individuals for security purposes, and performing manufacturing and industrial tasks, etc. Computer vision techniques may use sensors to capture data of an environment and use this sensor data to detect and identify objects in the environment. Such techniques may utilize processors and associated memories, including various models, algorithms, and/or machine-learning algorithms to perform object detection and identification. For instance, machine-learned models may be trained to identify and predict characteristics of an object detected in a physical environment based on sensor data.

However, in some scenarios these existing techniques can be unreliable. Take, for example, a scenario in which an autonomous vehicle is to traverse an environment in which pedestrians are present. In such a scenario, it may be critical for the autonomous vehicle to capture sensor data and determine information about each pedestrian in the environment (e.g., whether a pedestrian is sitting, standing, walking, running, a speed and/or direction of travel of the pedestrian, an intent of the pedestrian, etc.) in order for the autonomous vehicle to safely traverse the environment. However, if a pedestrian in the environment is partially occluded such that the sensor data does not include a full frame of the pedestrian (e.g., only a portion of the pedestrian's body is visible, such as an arm or a leg), existing techniques can be unreliable at determining and/or predicting information about the pedestrian. Furthermore, when the pedestrian is partially occluded, these existing techniques can have strong tendencies to fail at detecting the pedestrian's presence in the environment altogether.

Accordingly, this disclosure describes various techniques for detecting key points associated with a pedestrian represented in sensor data. The disclosed techniques may be used to, among other things, detect a presence of visible pedestrians in an environment, as well as pedestrians that are partially occluded. Additionally, or alternatively, the disclosed techniques may be used to determine information associated with pedestrians in the environment (e.g., whether a pedestrian is sitting, standing, walking, running, a velocity and/or direction of travel of the pedestrian, an intent of the pedestrian, etc.). For instance, sensor data representing a portion of an environment may be input into a machine-learned model, and the machine-learned model may output one or more key points associated with a pedestrian who is in the environment. Based at least in part on the key points, a bounding box may be generated that indicates the presence of the pedestrian in the environment. In some instances, the bounding box and/or the key points may be used to control an autonomous vehicle.

In various examples, the techniques described in this disclosure for detecting key points associated with pedestrians can be performed using a "top-down" method or a "bottom-up" method. In the top-down method, for example, sensor data representing an environment may be input into a detector that detects the presence of pedestrians in the environment and generates a bounding box associated with the pedestrian. The sensor data may then be cropped based on the bounding box, and the cropped sensor data may be input into a machine-learned model that determines and/or generates one or more key points corresponding to the pedestrian.

Conversely, in the bottom-up method, sensor data representing an environment may be input into a machine-learned model that determines and/or generates one or more key points associated with pedestrians in the environment, and then the one or more key points may be used to generate a bounding box associated with the pedestrian, as well as determine information associated with the pedestrian, and the like. In some instances, the machine-learned model used in the bottom-up method may be configured to determine multiple groups of key points associated with objects (e.g., vehicles, pedestrians, traffic signs, cones, fire hydrants, benches, etc.) within sensor data, and then determine which of those groups of key points correspond to pedestrians (e.g., by analyzing an arrangement of a group of key points).

The techniques described in this disclosure can increase the consistency of detecting pedestrians in an environment based on sensor data, which was not previously possible using prior techniques. For instance, the described techniques may be used to reliably and repeatably detect the presence of partially occluded pedestrians in an environment who may have not otherwise been detectable at all using previous methods. Additionally, detecting key points associated with a pedestrian according to the disclosed techniques may be used to determine a pose of the pedestrian, an intent of the pedestrian, a velocity of the pedestrian, a predicted future location of the pedestrian, and/or the like, which may then be used by a vehicle to more safely traverse through an environment. Furthermore, the techniques described herein may further improve the functioning of sensor processing systems and/or object detection systems for detecting objects in an environment. For instance, the techniques may be used in the context of a security system to more reliably detect the presence of a wrongdoing person.

By way of example, and not limitation, a method according to the various techniques disclosed herein may include receiving image data captured by an image sensor of a vehicle. The image data may represent a portion of an environment in which the vehicle is operating. The environment may include one or more objects (e.g., vehicles, pedestrians, buildings, structures, etc.), and a representation(s) of the one or more objects may be included in the image data. In some instances, the vehicle may be an autonomous or semi-autonomous vehicle. In at least one example associated with the top-down method, the image data may be received from a detector. The detector may have determined a presence of a pedestrian in the environment based on the image data and generated a bounding box within the image data that is associated with the pedestrian (e.g., encompasses or bounds the pedestrian). Additionally, the detector may have cropped the image data based on the bounding box such that the image data is comparable in size to the bounding box (e.g., slightly larger than the bounding box, slightly smaller than the bounding box, etc.)

In some examples, the image data may be input into a machine-learned model that is configured to determine key points corresponding to physical features of pedestrians in the environment. That is, the machine-learned model may be trained to determine, based on analyzing the image data, a first key point that corresponds to a first physical feature (e.g., hand) of a first pedestrian, a second key point that corresponds to a second physical feature (e.g., elbow) of the first pedestrian, a third key point that corresponds to a third physical feature (e.g., shoulder) of the first pedestrian, and so forth for the first pedestrian, as well as for additional pedestrians included in the image data. As used herein, "physical features" of pedestrians can include hands, wrists, elbows, shoulders, hips, knees, ankles, feet, eyes, noses, ears, mouths, fingers, torsos, necks, and the like.

In some examples, the method may include receiving an output from the machine-learned model. The output may include, in some instances, multiple key points associated with a first pedestrian in the environment. In at least one example, the multiple key points may include one or more key points corresponding to occluded physical features of the first pedestrian (e.g., physical features that are not visible in the image data). Additionally, the multiple key points may include one or more key points corresponding to visible (or nonoccluded) physical features of the first pedestrian. In some examples, the output may include metadata indicating which key points correspond to occluded physical features and which key points correspond to physical features that are visible.

In various examples, the output from the machine-learned model may include a set number of predicted key points for every identified pedestrian. For instance, a set of key points corresponding to a pedestrian may include 12 key points, 15 key points, 17 key points, and/or the like. In some examples, a key point may be predicted for every physical feature of a pedestrian, such as feet/ankles, knees, hips, shoulders, elbows, hands/wrists, eyes, ears, nose, etc. Additionally, this may include predicted key points for a pedestrian even if the pedestrian does not have those physical features. In other words, in the case of a pedestrian who may have a disability and/or may be missing an arm, a leg, etc., key points for these physical features may still be determined/predicted. However, in some examples, the machine-learned model may be trained to determine when a pedestrian has a disability (e.g., missing arm, leg, etc.) and the output may indicate that the pedestrian has the disability or is missing their arm, leg, etc.

In some instances, the output received from the machine-learned model may include multiple "links" connecting the multiple key points. For instance, the output may include a first link that connects a first key point to a second key point, a second link that connects the second key point to a third key point, a third link that connects the third key point to a fourth key point, and so forth. In at least one example, an individual key point may only be connected to, at most, two other key points via two links. However, a termination key point (e.g., associated with a pedestrian's hand/wrist or the pedestrian's foot/ankle) may only be connected to, at most, one other key point via a single link. In some examples, the links (or the key points) can be based on a biomechanical model such that links of key points taken into account a human's or other's objects skeletal structure, for example. For example, a key point corresponding to a head of a user may be linked to a key point corresponding to a neck or torso no other key points (based on a biometric model of a human). In this manner, linking a head to a hand, for example, can be mitigated. In other words, key points and/or links may be based on physically connected parts of an object to be modeled via key points. Similarly, the key points or links can be based on a model of an object to be represented by corresponding key points/links.

In various examples, the output that is received from the machine-learned model may include a confidence score associated with the multiple key points. In at least one example, the confidence score may represent a first probability that the multiple key points are actually associated with the first pedestrian. That is, the first probability may be associated with whether the multiple key points actually correspond with a person, or whether the multiple key points correspond with another object, such as a vehicle, a firehydrant, a traffic sign, a bench, another pedestrian, or the like. In some examples, the first probability may be associated with whether the key points correspond to a same pedestrian (e.g., whether all of the key points are associated with a first pedestrian and not a second pedestrian). Alternatively, or additionally, the confidence score may represent a second probability that a first key point of the multiple key points correctly corresponds to a first physical feature of the first pedestrian (e.g., a probability that the first key point correctly corresponds to the first pedestrian's elbow, for instance, and not the first pedestrian's foot, ankle, knee, etc.). Alternatively, or additionally, the confidence score may represent a third probability that the predicted key point corresponds to the occluded physical feature of the first pedestrian (e.g., a probability that the key point has predicted the actual location of the occluded first physical feature of the first pedestrian). In some examples, the confidence score may be based on a combination of some or all of the first probability, the second probability, and the third probability, as well as other probabilities not described. Additionally, in some instances the confidence score may be based on how closely an arrangement of the multiple key points corresponds with previously identified arrangements of key points that were verified to correspond with pedestrians.

The method may further include, in some examples, generating a bounding box associated with the first pedestrian. In some instances, generating the bounding box may be based at least in part on receiving the output from the machine-learned model. For instance, the bounding box may encompass the multiple key points. In some examples, the bounding box may indicate a smallest area of the image data in which the key points are encompassed. In other words, the bounding box may be of a minimum size such that the multiple key points are contained within the bounding box, but if the size of the bounding box was to be decreased, one or more of the multiple key points would be outside of the bounding box. In at least one example, the bounding box may indicate that the first pedestrian is in the environment. For instance, data representing the bounding box and/or the key points may be sent to a controller (e.g., prediction component, planning component, and/or the like) of the vehicle to indicate the presence of the first pedestrian in the environment. A bounding box may bound obfuscated or non-obfuscated key points.

In some examples, the method may include controlling the vehicle based at least in part on the bounding box and/or the multiple key points. For example, based on the bounding box and/or the multiple key points, a trajectory of the vehicle may be changed to, for instance, prevent a collision with the first pedestrian.

In at least one example, the method may include determining, a predicted pose of the first pedestrian based at least in part on an arrangement of the multiple key points. For instance, the multiple key points may be arranged such that they correspond to a specific pose. As used herein, a "pose" of a pedestrian may include sitting, standing, walking, kneeling, laying down, facing right, facing left, facing forward, facing backward, and/or the like, as well as combinations thereof. A pose can include an orientation and position in three-dimensional space of an object. In some instances, the vehicle may be controlled based at least in part on determining a pose.

In an additional, or alternative, example, a predicted future location of the first pedestrian may be determined based at least in part on the arrangement of the multiple key points. For instance, the multiple key points may be arranged such that they correspond to a pose associated with the first pedestrian walking in a specific direction. Additionally, the arrangement of the multiple key points may further be indicative of a velocity at which the first pedestrian is walking. In this way, the pose and the velocity may be used to determine the future location of the first pedestrian.

Additionally, or alternatively, the arrangement of the key points may be input into another machine learned model or deterministic methods may be used to determine the pose, the velocity, and/or the future location of the pedestrian. In some examples, the vehicle may be controlled based at least in part on the predicted future location of the first pedestrian, the pose, and/or the velocity.

This disclosure also includes techniques for training machine-learned models to perform techniques described herein for detecting key points associated with objects in an environment based on inputted sensor data. By way of example, and not limitation, a method for training a machine-learned model may include receiving sensor data representing a portion of an environment in which a vehicle is operating. The sensor data may comprise image data, lidar data, and/or radar data representing the portion of the environment. In some examples, the sensor data may have been captured by a sensor system of the vehicle. Additionally, the sensor data may comprise training data.

In some examples, the method may also include receiving key points corresponding to physical features of a pedestrian in the environment. For instance, the received key points may comprise predetermined key points that were determined by a person who is training the machine-learned model, a trained machine-learned model, and the like. In some instances, links connecting the key points with one another may also be received. In at least one example, the key points may be associated with a three-dimensional (3D) space (e.g., 3D points in a camera coordinate frame). For instance, the key points may comprise two-dimensional (2D) key points (e.g., 2D key points in an image plane) that were converted to the 2D space from the 3D space.

The method may further include, in some examples, inputting the sensor data into a machine-learned model that is to be trained. Based on inputting the sensor data into the machine-learned model, an output may be received from the machine-learned model that includes predicted key points corresponding to the physical features of the pedestrian. Additionally, the output may include predicted links connecting the predicted key points.

In some examples, the method may include determining a difference between the key points and the predicted key points. For instance, a first difference (e.g., distance) between a first key point corresponding to a first physical feature of the pedestrian and a first predicted key point corresponding to the first physical feature of the pedestrian may be determined, a second difference between a second key point corresponding to a second physical feature of the pedestrian and a second predicted key point corresponding to the second physical feature of the pedestrian may be determined, and so forth. Additionally, a difference may be determined between the links and the predicted links in a similar fashion, as well as determining whether a first link connecting the first key point and the second key point is matched by a first predicted link connecting the first predicted key point and the second predicted key point, and so forth.

In various examples, based at least in part on the difference, a parameter of the machine-learned model may be altered to minimize the difference to obtain a trained machine-learned model that is configured to determine the key points corresponding to the physical features of the pedestrian. In some examples, the machine-learned model may additionally be trained using heteroscedastic loss techniques and/or binary heatmap techniques. After the parameter has been altered and the trained machine-learned model has been obtained (in some examples, based on several iterations of training data), the method may include inputting the sensor data into the trained machine-learned model and receiving, from the trained machine-learned model, the key points corresponding to the physical features of the pedestrian.

In some examples, the sensor data used to train the machine-learned model may be modified to include a gaussian disk and/or a uniform disk before being input into the machine-learned model. For instance, if the sensor data is image data, then regions of pixels within the image data that are of important interest may be identified before the image data is input into the machine-learned model to improve training. The gaussian disk or uniform disk may be of a size that includes, for instance, a 32-pixel radius (e.g., 1,024π square pixel area), however other sizes of the gaussian disk or uniform disk may be used. By way of example, a region within image data that includes a pedestrian may be indicated to the machine-learned model using the gaussian disk and/or the uniform disk. This may increase, among other things, the rate at which the machine-learned model is trained (e.g., by requiring less training data), the accuracy of the trained machine-learned model, and/or the like.

The techniques described herein can be implemented in a number of ways. For instance, as already described above, the techniques for detecting key points associated with pedestrians based on sensor data may be performed according to a top-down technique or a bottom-up technique. Additionally, these techniques may be performed in parallel in some instances. Example implementations are provided below with reference to the following figures. Although discussed in the context of an autonomous vehicle, the techniques described herein can be applied to a variety of systems requiring control and/or interaction with objects in an environment and is not limited to autonomous vehicles. In another example, the systems, methods, and apparatuses can be used in an aviation or in a nautical context, as well as a security context. Furthermore, although many of the examples described herein are with reference to image data, the techniques disclosed herein can be similarly performed based on inputs consisting of different data types (e.g., lidar data, radar data, sonar data, etc.).

FIG. 1 is a pictorial flow diagram illustrating an example data flow 100 associated with detecting key points corresponding with pedestrians 102 based on image data 104 captured by a vehicle 106. The key points may be detected using a top-down method 108 or a bottom-up method 110.

The image data 104 may represent an image 112 of an environment in which the vehicle 106 is operating. In some examples, the image 112 of the environment may include one or more pedestrians, such as the pedestrians 102, as well as one or more objects, such as the object 114 which comprises a vehicle. In some examples, an image sensor of the vehicle 106 may capture the image data 104 representing the image 112.

According to the top-down method 108, the image data 104 representing the image 112 may be input into a detector 116. The detector 116 may detect, based on the image data 104, that the image 112 includes the pedestrians 102. Based on detecting the pedestrians 102, the detector 116 may generate bounding boxes 118 associated with the pedestrians 102. In some instances, the detector 116 or another component of the vehicle may crop the image 112 such that the image 112 comprises a cropped image 120 sized to fit the bounding boxes 118.

In some instances, image data representing the cropped image 120 that includes the pedestrians 102 and the bounding boxes 118 may be input into a machine-learned model 122(1). The machine-learned model 122(1) may be configured to determine key points associated with the pedestrians 102 based at least in part on the inputted image data. As such, in some instances a cropped image with key points 124 may be received from the machine-learned model 122(1).

According to the bottom-up method 110, the image data 104 representing the image 112 may be input into a machine-learned model 122(2). The machine-learned model 122(2) may be trained to determine key points associated with the pedestrians 102 based on receiving the inputted image data 104 representing the full frame image 112. Accordingly, the machine learned model 122(2) may output a key point mapped image 126 in which key points have been generated that correspond to various physical features of the pedestrians 102.

In some instances, the machine learned model 122(2) may generate key points associated with both the pedestrians 102 and the object 114 of the image 112. The machine-learned model 122(2) may further be trained to determine that an arrangement of the key points associated with each of the pedestrians 102 correspond with pedestrians (e.g., actual human beings and not other objects). Additionally, the machine-learned model 122(2) may be trained to determine that an arrangement of the key points associated with the object 114 (the vehicle) do not correspond with a pedestrian. As such, generating the key point mapped image 126 may be based on analyzing the arrangements of the different key points associated with the pedestrians 102 and the object 114, and determining that the key points associated with the object 114 do not correspond with a pedestrian but that the key points associated with the pedestrians 102 do correspond with pedestrians (e.g., actual human beings).

In some examples, the key point mapped image 126 may be sent to a vehicle computing device 128 or another component associated with the vehicle. Based at least in part on receiving the key point mapped image 126, the vehicle computing device 128 may generate one or more bounding boxes 118 associated with the pedestrians 102 such that the key point mapped image 126 comprises a bounding box modified image 130. The bounding box modified image 130 may include the key points associated with the pedestrians 102.

Figure 2:
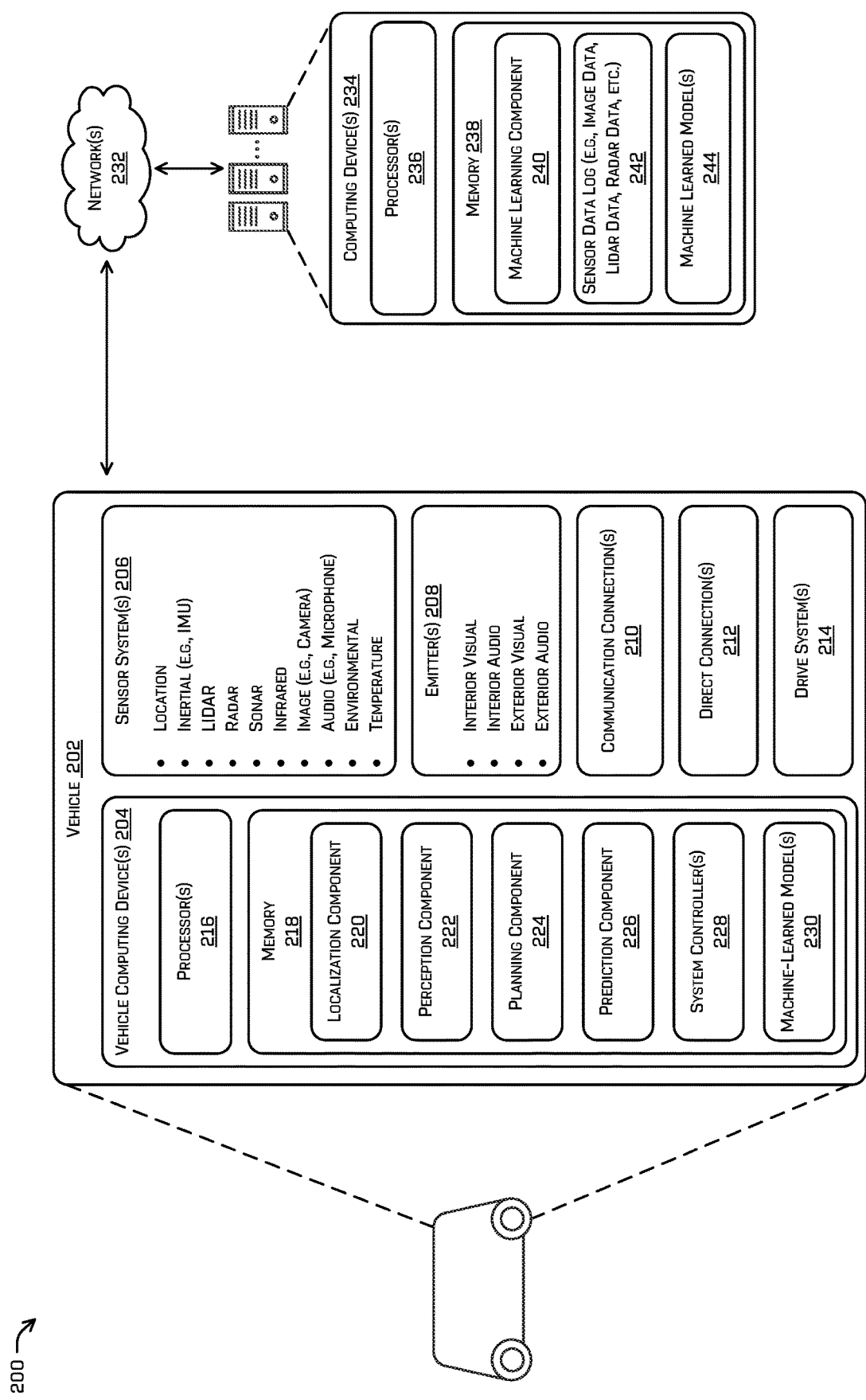
FIG. 2 is a block diagram illustrating an example system for implementing some of the various technologies described herein.

FIG. 2 is a block diagram illustrating an example system 200 for implementing some of the various technologies described herein. In at least one example, the example system 200 may include a vehicle 202, which can be similar to the vehicle 106 described above with reference to FIG. 1. In the illustrated example system 200, the vehicle 202 is an autonomous vehicle; however, the vehicle 202 may be any other type of vehicle.

The vehicle 202 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 202 may be configured to control all functions from start to completion of the trip, including all parking functions, it may not include a driver and/or controls for driving the vehicle 202, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 202 may be any configuration of vehicle, such as, for example, a van, a sport utility vehicle, a cross-over vehicle, a truck, a bus, an agricultural vehicle, and/or a construction vehicle. The vehicle 202 may be powered by one or more internal combustion engines, one or more electric motors, hydrogen power, any combination thereof, and/or any other suitable power sources. Although the vehicle 202 has four wheels, the systems and methods described herein may be incorporated into vehicles having fewer or a greater number of wheels, and/or tires. The vehicle 202 may have four-wheel steering and may operate generally with equal or similar performance characteristics in all directions, for example, such that a first end of the vehicle 202 is the front end of the vehicle 202 when traveling in a first direction, and such that the first end becomes the rear end of the vehicle 202 when traveling in the opposite direction. Similarly, a second end of the vehicle 202 is the front end of the vehicle when traveling in the second direction, and such that the second end becomes the rear end of the vehicle 202 when traveling in the opposite direction. These example characteristics may facilitate greater maneuverability, for example, in small spaces or crowded environments, such as parking lots and/or urban areas.

The vehicle 202 may include one or more computing device(s) 204, one or more sensor system(s) 206, one or more emitter(s) 208, one or more communication connection(s) 210 (also referred to as communication devices and/or modems), at least one direct connection 212 (e.g., for physically coupling with the vehicle 202 to exchange data and/or to provide power), and one or more drive system(s) 214. The one or more sensor system(s) 206 may be configured to capture sensor data (e.g., image data, lidar data, radar data, etc.) associated with an environment in which the vehicle 202 is operating.

The sensor system(s) 206 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 206 may include multiple instances of each of these or other types of sensors. For instance, the time-of-flight sensors may include individual time-of-flight sensors located at the corners, front, back, sides, and/or top of the vehicle 202. As another example, the camera sensors may include multiple camera modules disposed at various locations about the exterior and/or interior of the vehicle 202. The sensor system(s) 206 may provide input to the computing device(s) 204.

The vehicle 202 may also include one or more emitter(s) 208 for emitting light and/or sound. The one or more emitter(s) 208 in this example include interior audio and visual emitters to communicate with passengers of the vehicle 202. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 202 may also include one or more communication connection(s) 210 that enable communication between the vehicle 202 and one or more other local or remote computing device(s) (e.g., a remote teleoperations computing device) or remote services. For instance, the communication connection(s) 210 may facilitate communication with other local computing device(s) on the vehicle 202 and/or the drive system(s) 214. Also, the communication connection(s) 210 may allow the vehicle 202 to communicate with other nearby computing device(s) (e.g., other nearby vehicles, traffic signals, etc.).

The communications connection(s) 210 may include physical and/or logical interfaces for connecting the computing device(s) 204 to another computing device or one or more external networks 232 (e.g., the Internet). For example, the communications connection(s) 210 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 202 may include one or more drive system(s) 214. In some examples, the vehicle 202 may have a single drive system 214. In at least one example, if the vehicle 202 has multiple drive systems 214, individual drive systems 214 may be positioned on opposite ends of the vehicle 202 (e.g., the front and the rear, etc.). In at least one example, the drive system(s) 214 may include one or more sensor system(s) 206 to detect conditions of the drive system(s) 214 and/or the surroundings of the vehicle 202. By way of example and not limitation, the sensor system(s) 206 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 214. In some cases, the sensor system(s) 206 on the drive system(s) 214 may overlap or supplement corresponding systems of the vehicle 202 (e.g., sensor system(s) 206).

The drive system(s) 214 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 may include a drive system controller which may receive and preprocess data from the sensor system(s) 206 and to control operation of the various vehicle systems. In some examples, the drive system controller may include one or more processor(s) and memory communicatively coupled with the one or more processor(s). The memory may store one or more modules to perform various functionalities of the drive system(s) 214. Furthermore, the drive system(s) 214 also include one or more communication connection(s) that enable communication by the respective drive system with one or more other local or remote computing device(s).

The computing device(s) 204 may be similar to the vehicle computing device 128 described above with reference to FIG. 1. The computing device(s) 204 may include one or more processor(s) 216 and memory 218 communicatively coupled with the one or more processor(s) 216. In the illustrated example, the memory 218 of the computing device(s) 204 stores a localization component 220, a perception component 222, a planning component 224, a prediction component 226, one or more system controller(s) 228, and one or more machine-learned models 230. Though depicted as residing in the memory 218 for illustrative purposes, it is contemplated that the localization component 220, the perception component 222, the planning component 224, the prediction component 226, the one or more system controller(s) 228, and the one or more machine-learned models 230 may additionally, or alternatively, be accessible to the computing device(s) 204 (e.g., stored in a different component of vehicle 202 and/or be accessible to the vehicle 202 (e.g., stored remotely).

In the memory 218 of the computing device(s) 204, the localization component 220 may include functionality to receive data from the sensor system(s) 206 to determine a position of the vehicle 202. For example, the localization component 220 may include and/or request/receive a three-dimensional map of an environment and may continuously determine a location of the autonomous vehicle within the map. In some instances, the localization component 220 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 220 may provide data to various components of the vehicle 202 to determine an initial position of an autonomous vehicle for generating a trajectory, as discussed herein.

The perception component 222 may include functionality to perform object detection, segmentation, and/or classification. In some examples, the perception component 222 may provide processed sensor data that indicates a presence of an entity that is proximate to the vehicle 202 and/or a classification of the entity as an entity type (e.g., car, pedestrian, cyclist, building, tree, road surface, curb, sidewalk, unknown, etc.). In additional and/or alternative examples, the perception component 222 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The perception component 222 may include functionality to store perception data generated by the perception component 222. In some instances, the perception component 222 may determine a track corresponding to an object that has been classified as an object type. For purposes of illustration only, the perception component 222, using sensor system(s) 206 may capture one or more images of an environment. The sensor system(s) 206 may capture images of an environment that includes an object, such as a building, vehicle, trees, streetlights, pedestrians, etc.

The stored perception data may, in some examples, include fused perception data captured by the vehicle. Fused perception data may include a fusion or other combination of sensor data from sensor system(s) 206, such as image sensors, lidar sensors, radar sensors, time-of-flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data.

In at least one example, the perception component 222 utilizes one of the machine-learned models 230 to detect key points associated with objects and/or pedestrians in an environment in which the vehicle 202 is operating. For instance, the perception component 222 may input image data representing an environment into one of the machine-learned models 230 and receive, as an output, multiple key points corresponding to physical features of a pedestrian.

The planning component 224 may determine a path for the vehicle 202 to follow to traverse through an environment. For example, the planning component 224 may determine various routes and paths and various levels of detail. In some instances, the planning component 224 may determine a route to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 224 may generate an instruction for guiding the autonomous vehicle along at least a portion of the route from the first location to the second location. In at least one example, the planning component 224 may determine how to guide the autonomous vehicle from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planning component 224 may alternatively, or additionally, use data from the perception component 222 to determine a path for the vehicle 202 to follow to traverse through an environment. For example, the planning component 224 may receive data from the perception component 222 regarding objects associated with an environment. Using this data, the planning component 224 may determine a route to travel from a first location (e.g., a current location) to a second location (e.g., a target location) to avoid objects in an environment. In at least some examples, such a planning component 224 may determine there is no such collision free path and, in turn, provide a path which brings vehicle 202 to a safe stop avoiding all collisions and/or otherwise mitigating damage. In at least one example, the planning component 224 may receive key points associated with objects and/or pedestrians from the perception component and determine a trajectory of the vehicle based on the received key points.

The memory 218 of the computing device(s) 204 may additionally store a prediction component 226 that is configured to estimate current, and/or predict future, characteristics or states of an object (e.g., a pedestrian, animal, etc.), such as pose, speed, trajectory, velocity, yaw, yaw rate, roll, roll rate, pitch, pitch rate, position, acceleration, or other characteristics, based on one or more images of the object. For instance, the prediction component 226 may receive image data from sensor data captured by a camera or other image sensor of sensor system(s) 206 and predict one or more of the foregoing characteristics of the object. The prediction can be made based on a single image or multiple images (e.g., multiple sequential image frames) depicting the object.

In at least one example, the computing device(s) 204 may include one or more system controller(s) 228, which may be configured to control steering, propulsion, braking, safety, emitters, communication, and other systems of the vehicle 202. These system controller(s) 228 may communicate with and/or control corresponding systems of the drive system(s) 214 and/or other components of the vehicle 202, which may be configured to operate in accordance with a path provided from the planning component 224.

The memory 218 of the vehicle computing devices 204 may additionally include the one or more machine-learned models 230. In some examples, the machine-learned models 230 may include a first machine-learned model that is trained to detect key points associated with pedestrians according to the top-down method described herein and a second machine-learned model that is trained to detect key points associated with objects and/or pedestrians according to the bottom-up method described herein. In various examples, the machine-learned model(s) 230 may be implemented as neural network(s), convolution neural network(s), or recurrent neural network(s).

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The vehicle 202 may connect to one or more computing device(s) 234 via one or more network(s) 232. The computing device(s) 234 include one or more processor(s) 236 and memory 238 communicatively coupled with the one or more processor(s) 236. In at least one instance, the one or more processor(s) 236 may be similar to the processor(s) 216 and the memory 238 may be similar to the memory 218. In the illustrated example, the memory 238 of the computing device(s) 234 stores a machine learning component 240, a sensor data log 242, and one or more machine-learned model(s) 244. Though depicted as residing in the memory 238 for illustrative purposes, it is contemplated that the machine learning component 240, the sensor data log 242, and the machine-learned model(s) 244 may additionally, or alternatively, be accessible to the computing device(s) 234 (e.g., stored in a different component of computing device(s) 234 and/or be accessible to the computing device(s) 234 (e.g., stored remotely).

In the memory 238 of the computing device(s) 234, the machine learning component 240 may be used to train the one or more machine-learned model(s) 230 and/or 244. For instance, the machine-learning component 240 may access training data stored in the sensor data log 242 in order to train the one or more machine-learned model(s) 230 and/or 244. The sensor data log 242 may include various data logs based on different sensor data types, such as image data, lidar data, radar data, and the like. Additionally, the sensor data log 242 may include 3D key point training data and 2D key point training data. The machine learning component 240 may include functionality to receive real data, modified data, and/or simulated data to train one or more untrained neural networks to generate a plurality of trained neural networks. During training, the machine learning model component 240 may adjust weights, filters, connections between layers, and/or parameters for training the individual untrained neural networks to perform key point detection (or other tasks), as discussed herein. In some instances, the machine learning component 240 may use supervised or unsupervised training.

Additionally, the memory 238 stores the machine-learned model(s) 244. In at least one examples, the machine-learned models 244 may be similar to the machine-learned models 230 stored by the memory 218 of the vehicle computing devices 204. For instance, the machine-learned models 244 may include the first machine-learned model that is trained to detect key points associated with pedestrians according to the top-down method described herein and the second machine-learned model that is trained to detect key points associated with objects and/or pedestrians according to the bottom-up method described herein. In various examples, the machine-learned model(s) 244 may be implemented as neural network(s), convolution neural network(s), or recurrent neural network(s).

The processor(s) 216 of the computing device(s) 204 and the processor(s) 236 of the computing device(s) 234 may be any suitable processor capable of executing instructions to process data and perform operations as described herein. By way of example and not limitation, the processor(s) 216 and 236 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 218 of the computing device(s) 204 and the memory 238 of the computing device(s) 234 are examples of non-transitory computer-readable media. The memory 218 and 238 may store an operating system and one or more software applications, instructions, programs, and/or data to implement the methods described herein and the functions attributed to the various systems. In various implementations, the memory 218 and 238 may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein may include any models, algorithms, and/or machine learning algorithms. For example, in some instances, the components in the memory 218 and 238 may be implemented as one or more neural network(s).

Figure 3:
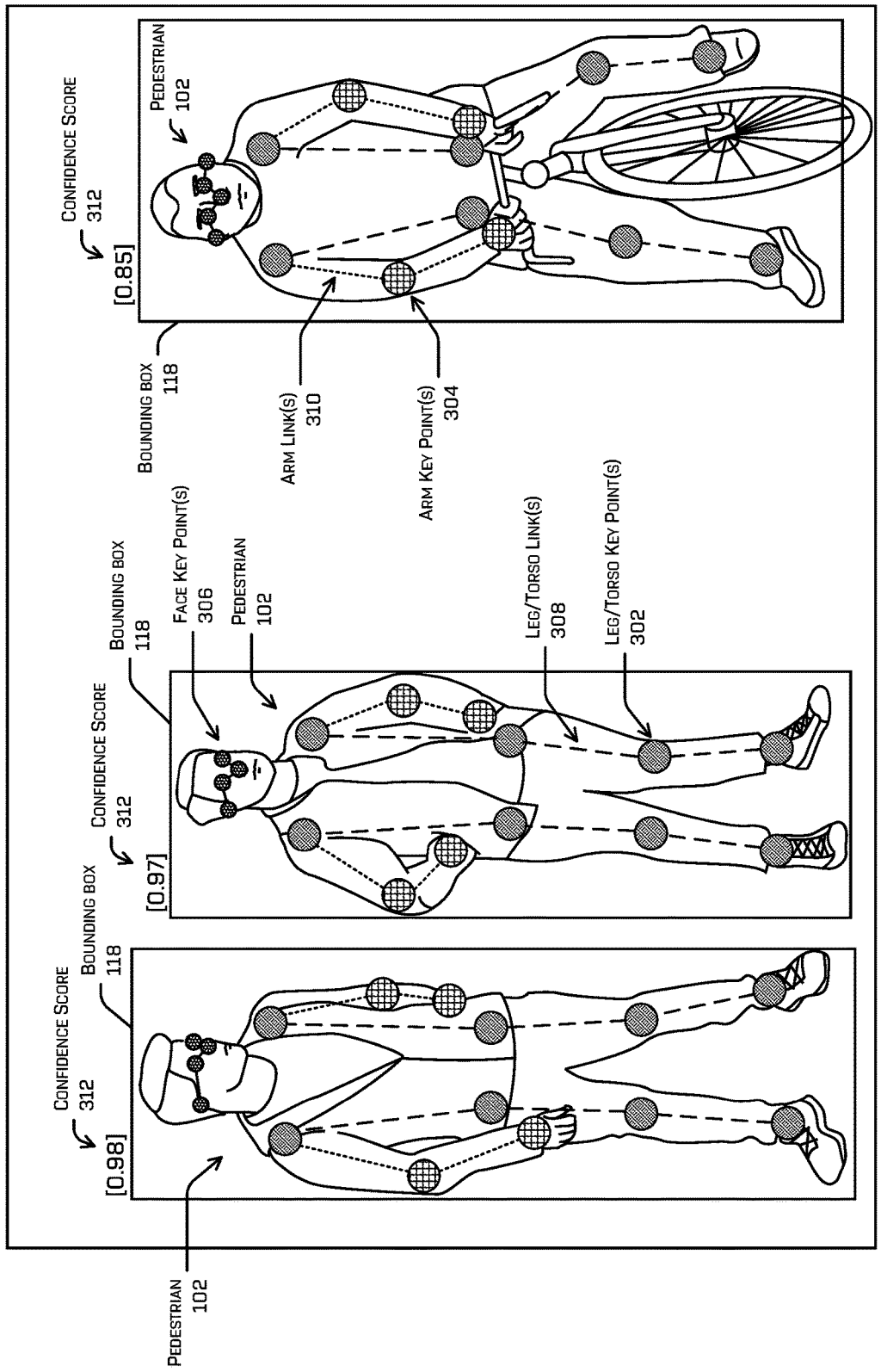
FIG. 3 illustrates an example image in which key points associated with pedestrians have been determined.

FIG. 3 illustrates an example image 300 in which key points associated with pedestrians 102 have been determined. As shown, the key points may include one or more leg/torso key points 302 (indicated by a first stippling pattern), one or more arm key points 304 (indicated by a second stippling pattern), and one or more face key points 306 (indicated by a third stippling pattern). In at least one example, the different stippling patterns correspond to different colors (e.g., red, yellow, blue, green, purple, orange, etc.) or categories that may be used to indicate a physical feature of one or the pedestrians 102 to which the key point corresponds to. By way of example, and not limitation, a key point corresponding to the pedestrian's 102 wrist or hand (e.g., arm key point 304) may be colored green, whereas a key point corresponding to the pedestrian's 102 knee or ankle (leg/torso key point 302) may be colored yellow, and a key point corresponding to the pedestrian's 102 eye or ear (face key point 306) may be colored blue.

In various examples, the one or more leg/torso key points 302 may correspond to physical features of the pedestrians 102 including, for instance, feet, ankles, knees, hips, and/or shoulders. The leg/torso key points may further be connected to one another via a leg/torso link(s) 308. In some instances, a leg/torso link (or segment) 308 may be a specific color (e.g., red, yellow, blue, etc.) to indicate that it corresponds to a leg/torso link 308.

In some examples, the one or more arm key points 304 may correspond to physical features of the pedestrians 102 including, for example, hands, wrists, and/or elbows. The arm key points 304 may be connected to one another via one or more arm link(s) 310. In some instances, the one or more arm link(s) 310 may be a specific color to indicate that it is an arm link 310. For instance, the arm link(s) 310 connecting the pedestrian's 102 shoulder key point(s) to their elbow key point(s) may be a first specific color (e.g., yellow) to indicate that they are arm links 310, whereas the leg/torso link(s) 308 connecting the pedestrian's 102 shoulder key point(s) to their hip key point(s) may be a second specific color (e.g., green) to indicate that they are leg/torso links 308.

In some examples, the one or more face key point(s) 306 may correspond to physical features of the pedestrian's 102 faces including, for instance, eyes, ears, mouths, noses, etc. The face key point(s) 306 may be connected to one another to indicate an orientation and/or pose associated with a pedestrian's 102 face.

In some instances, the image 300 may include confidence scores 312 associated with the key points determined for each of the pedestrians 102. For instance, the confidence scores 312 may represent a first probability that the key points are associated with the pedestrians 102. That is, the first probability may be associated with whether the key points actually correspond with a person and/or the same person, or whether the key points correspond with another object, such as a vehicle, a fire-hydrant, a traffic sign, a bench, another person, or the like. Alternatively, or additionally, the confidence scores 312 may represent a second probability that an individual key point correctly corresponds to a first physical feature of the pedestrians 102 (e.g., a probability that the first key point correctly corresponds to the pedestrian's elbow, for instance, and not the pedestrian's foot, ankle, knee, etc.). In some examples, the confidence score may be based on a combination of some or all of the first probability, the second probability, as well as other probabilities not described.

Figure 4A:
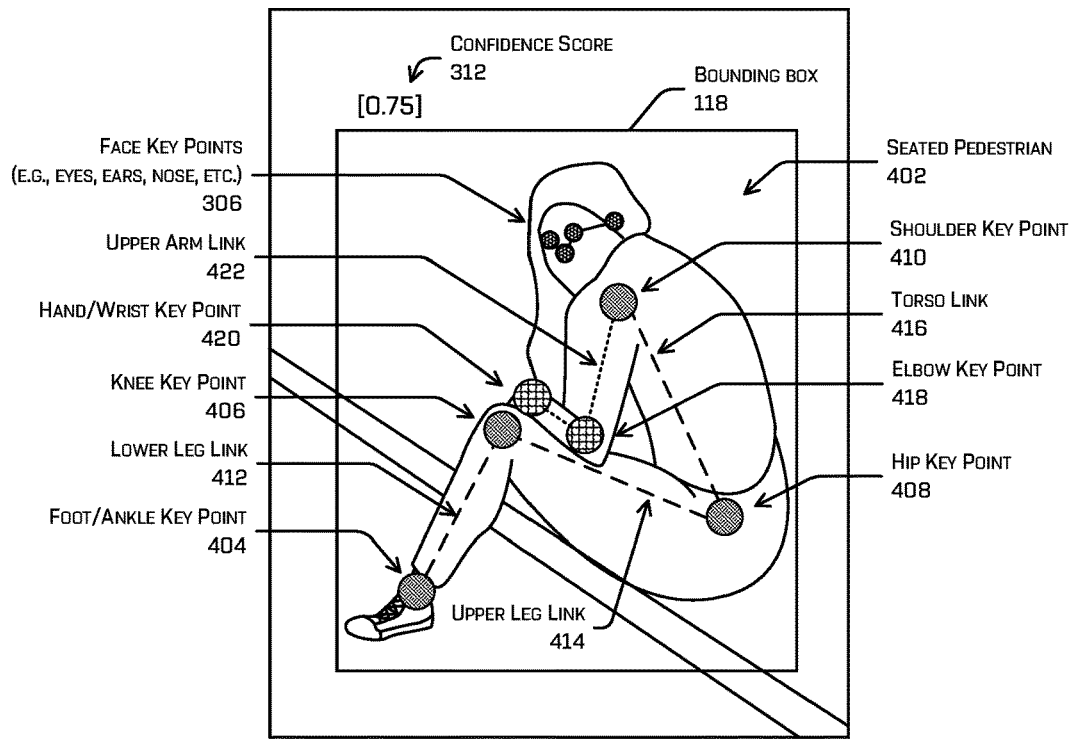
FIGS. 4A and 4B illustrate example images in which key points associated with seated and crouching pedestrians have been determined.
Figure 4B:
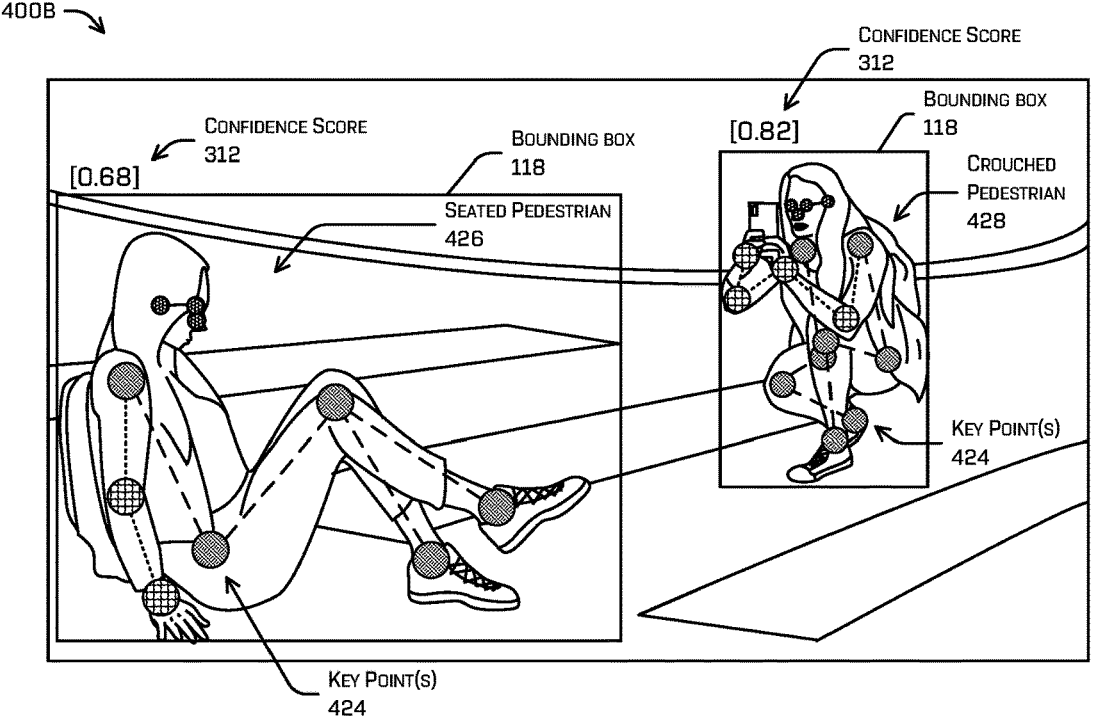

FIGS. 4A and 4B illustrate example images 400A and 400B in which key points associated with seated and crouching pedestrians have been determined. The example image 400A depicts an example of a seated pedestrian 402.

In the image 400A, multiple key points have been determined that correspond to physical features of the seated pedestrian 402. For instance, the multiple key points include face key points 306 that correspond to an ear, a nose, and eyes of the seated pedestrian 402. Additionally, the multiple key points include leg/torso key points such as a foot and/or ankle key point 404 corresponding to the seated pedestrian's 402 foot and/or ankle, a knee key point 406 corresponding to the seated pedestrian's 402 knee, a hip key point 408 corresponding to the seated pedestrian's 402 hip, and a shoulder key point 410 corresponding to the seated pedestrian's 402 shoulder. Furthermore, a lower leg link 412 may connect the foot and/or ankle key point 404 to the knee key point 406, an upper leg link 414 may connect the knee key point 406 to the hip key point 408, and a torso link 416 may connect the hip key point 408 to the shoulder key point 410.

The multiple key points associated with the seated pedestrian 402 may also include an elbow key point 418 corresponding to an elbow of the seated pedestrian 402, as well as a hand and/or wrist key point 420 corresponding to the seated pedestrian's 402 hand and/or wrist. Additionally, an upper arm link 422 may connect the shoulder key point 410 to the elbow key point 418, and a forearm link may connect the elbow key point 418 to the hand and/or wrist key point 420. In some examples, the example image 400A includes the confidence score 312 that may be based at least in part on the key points detected for the seated pedestrian. Additionally, the example image 400A may include the bounding box 118 associated with the seated pedestrian 402, which may have been determined based on the detected key points.

The example image 400B includes example key point(s) 424 associated with the seated pedestrian 426 and the crouching pedestrian 428 have been determined. The key points 424 may correspond with physical features of the seated pedestrian 426 and the crouched pedestrian 428, such as feet, ankles, knees, hips, shoulders, elbows, wrists, hands, ears, eyes, noses, and/or mouths. Additionally, the arrangement of the key points 424 associated with the seated pedestrian 426 may be indicative that the seated pedestrian 426 is in a seated pose, while the arrangement of the key points 424 associated with the crouched pedestrian 428 may be indicative that the crouched pedestrian 428 is in a crouched pose.

Even furthermore, the arrangement of the key points 424 associated with the seated pedestrian 426 and the crouched pedestrian 428 may be indicative that the seated pedestrian 426 and the crouched pedestrian 428 are less likely to change locations because they are not in a standing or walking pose. In other words, an intent of the seated pedestrian 426 and the crouched pedestrian 428 may be determined based on the arrangement of the key points 424.

Figure 5B:
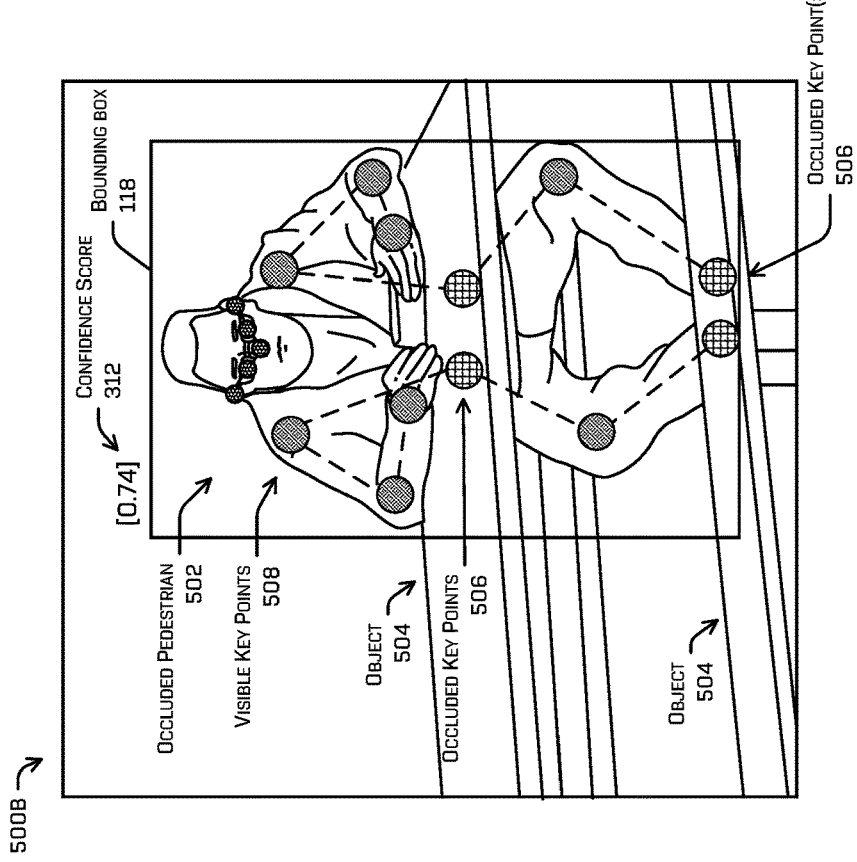
FIGS. 5A and 5B illustrate example images in which key points associated with partially occluded pedestrians have been determined.
Figure 5A:
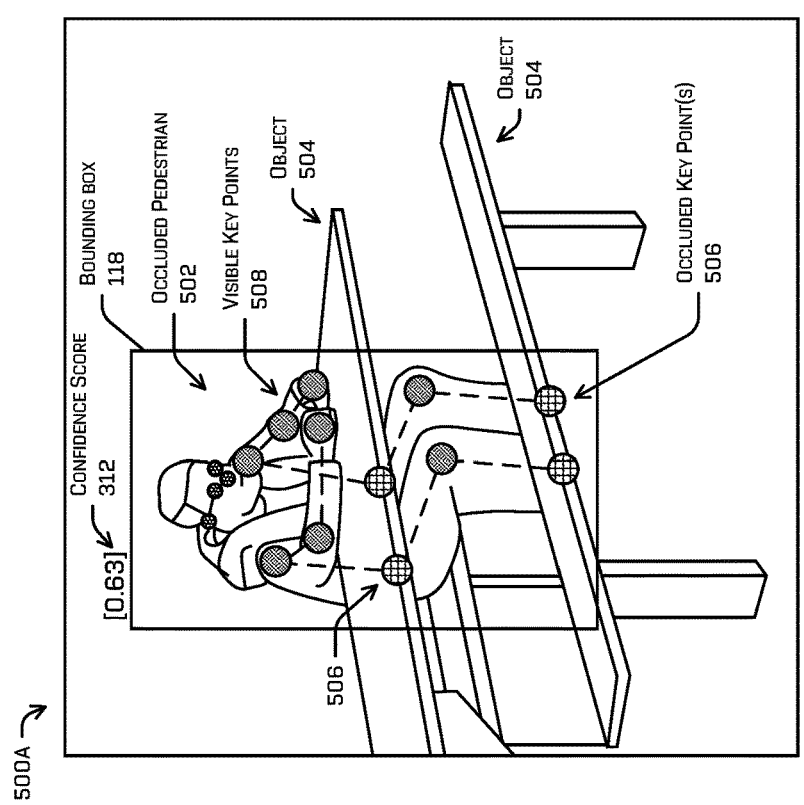

FIGS. 5A and 5B illustrate example images 500A and 500B in which key points associated with partially occluded pedestrians 502 have been determined. The occluded pedestrians 502 may be occluded by one or more objects 504. As shown, the key points associated with the occluded pedestrians 502 may be labeled or otherwise indicate whether a key point is an occluded key point 506 or a visible key point 508 (e.g., by different color key points, different pattern of key points, and the like). That is, the occluded key points 506 may correspond to physical features of the occluded pedestrian 502 that are occluded by the objects 504, whereas the visible key points 508 may correspond to physical features of the occluded pedestrian 502 that are visible in the images 500A and 500B.

In some examples, the location of the occluded key points 506 may be determined based at least in part on an arrangement of the visible key points 508. That is, in some instances, based on an arrangement of the visible key points 508 corresponding to previously identified key points of other pedestrians, a location of an occluded key point 506 may be determined that corresponds to a location of a corresponding one of the previously identified key points of the other pedestrians. In some instances, a given pedestrian may be mapped with a maximum number of key points (e.g., 17 key points, 18 key points, or any other number of key points). However, using the machine learning techniques described herein, the maximum number of key points for a pedestrian may be determined based on a minimum number of visible key points (e.g., 2, 3, 4, etc.). That is, if, for instance, only three physical features of the occluded pedestrian 502 are visible (e.g., a hand, an elbow, and a foot, for instance), then locations of the remaining physical features of the occluded pedestrian 502 may be predicted by the machine learned model and occluded key points 506 may be determined and/or generated to correspond to those occluded physical features.

In some instances, the bounding boxes 118 and the confidence scores 312 may be based at least in part on both the occluded key points 506 and the visible key points 508. For instance, the bounding box 118 may be a minimum size that encompasses all of the occluded key points 506 and the visible key points 508. Additionally, the confidence scores 312 may be based on, in some examples, how many key points of the occluded pedestrians 502 are occluded key points 506 and how many key points are visible key points 508.

FIGS. 6A and 6B are example images 600A and 600B that collectively illustrate how key points associated with occluded physical features of an occluded pedestrian 502 may be determined. For instance, the image data of the image 600A may be input into a machine-learned model and the output from the machine-learned model may comprise the image 600B.

The occluded pedestrian 502 may be occluded by the object 504. However, based on a configuration of the visible key points 508 identified for the occluded pedestrian 502, the occluded key points 506 may be determined and/or generated. Additionally, based on the arrangement or configuration of the visible key points 508 and the occluded key points 506, a predicted pose 602 associated with the occluded pedestrian 502 may be determined.

In some instances, the bounding box 118 and the confidence score 312 may be based at least in part on both the occluded key points 506 and the visible key points 508. For instance, the bounding box 118 may be a minimum size that encompasses all of the occluded key points 506 and the visible key points 508. Additionally, the confidence scores 312 may be based on, in some examples, how many key points of the occluded pedestrians 502 are occluded key points 506 and how many key points are visible key points 508. For instance, the confidence scores 312 associated with the occluded pedestrian 502 may be relatively low (e.g., 0.35) based at least in part on the difference between the number of occluded key points 506 and the number of visible key points 508.

Figure 7A:
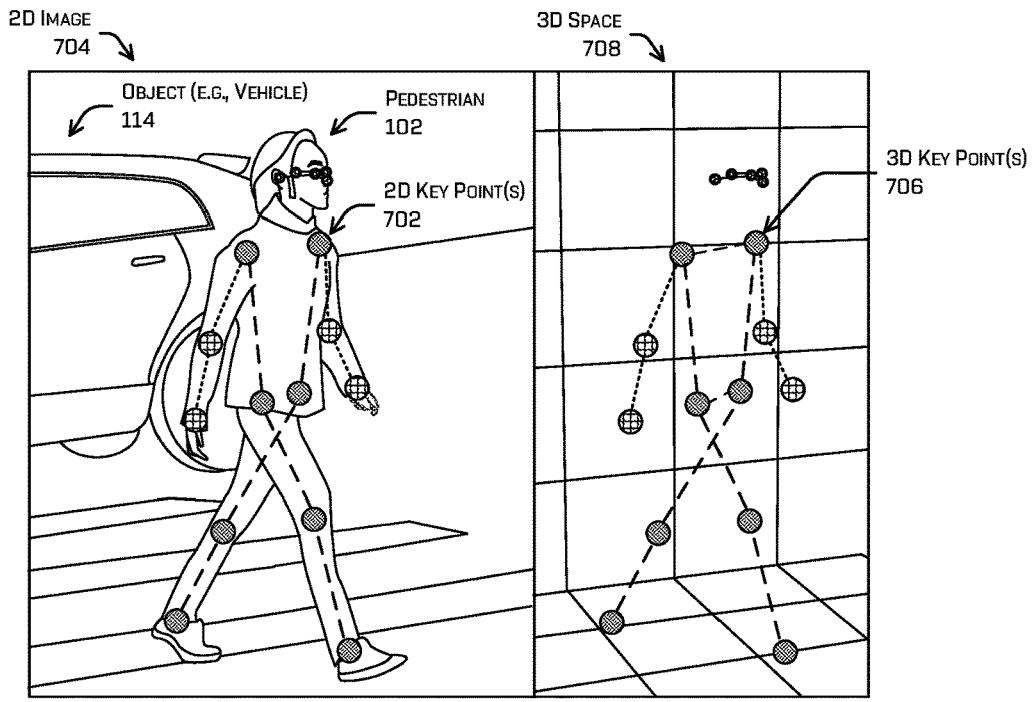
FIGS. 7A and 7B illustrate example training data including two-dimensional (2D) key points associated with 2D images and associated three-dimensional (3D) key points associated with a 3D space.
Figure 7B:
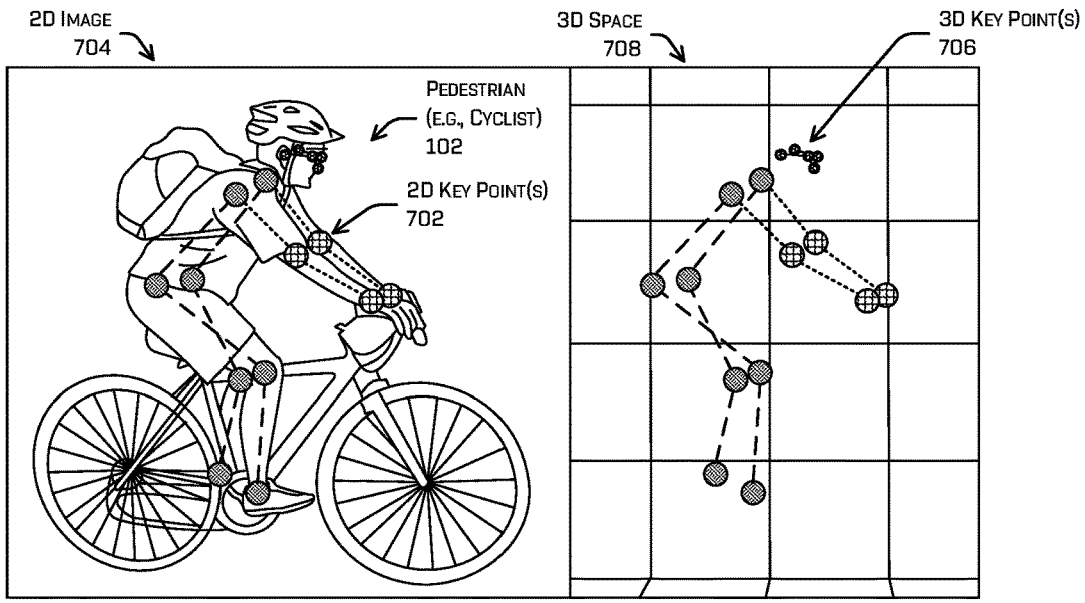

FIGS. 7A and 7B illustrate example training data 700A and 700B including two-dimensional (2D) key points 702 associated with 2D images 704 and corresponding three-dimensional (3D) key points 706 associated with a 3D space 708. The example training data 700A and 700B may be used, in whole or in part, to train a machine-learned model to detect key points associated with pedestrians.

In some examples, the 2D key points 702 may comprise 2D key points of a 2D image plane. Additionally, the 3D space 708 may comprise a 3D camera coordinate frame. In various examples, the 3D key points 706 may be determined with respect to the 3D space 708, and the 3D key points 706 of the 3D space 708 may be converted or mapped to the 2D image plane 704, and vice versa.

In various examples, a machine-learned model may be trained to determine one or more 3D key points 706 in the 3D space 708 based on receiving an input of a 2D image. Likewise, a machine-learned model may be trained to determine one or more 2D key points 702 based on receiving an input of 3D data (e.g., lidar data, etc.). In some instances, the 3D key points 706 (and similarly the 2D key points 702) may be used to determine gestures of the pedestrians 102 (e.g., such as riding a bike as shown in the image 700B), an intent of the pedestrians 102, a pose of the pedestrians 102, and the like.

Figure 8:
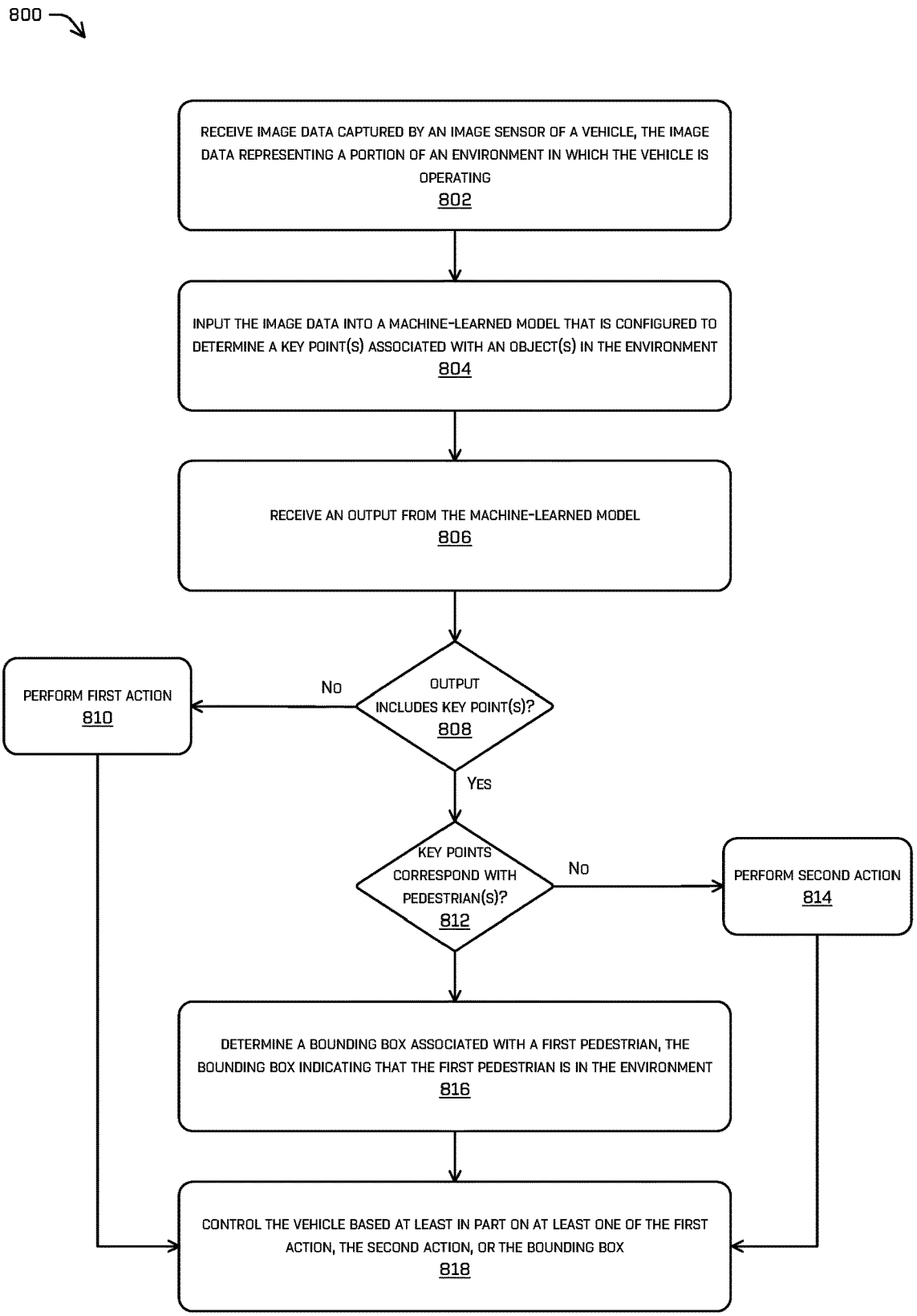
FIG. 8 is a flowchart illustrating an example method that may be performed at least in part by a vehicle computing device to control a vehicle using the key point detection techniques described herein.

FIG. 8 is a flowchart illustrating an example method 800 that may be performed at least in part by a vehicle computing device to control a vehicle using the key point detection techniques described herein. The method 800 illustrated in FIG. 8 is described with reference to one or more of the vehicles and/or systems described in FIGS. 1-7B for convenience and ease of understanding. However, the method 800 illustrated in FIG. 8 is not limited to being performed using the vehicles, systems, and/or techniques described in FIGS. 1-7B, and may be implemented using any of the other vehicles, systems, and technologies described in this application, as well as vehicles, systems, and technologies other than those described herein. Moreover, the vehicles, systems, and user interfaces described herein are not limited to performing the method 800 illustrated in FIG. 8.

The method 800 is illustrated as a collection of blocks in a logical flow graph, which represents sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some examples, one or more blocks of the process may be omitted entirely. Moreover, the method 800 may be combined in whole or in part with other methods described herein.

The method 800 begins at operation 802, which includes receiving image data captured by an image sensor of a vehicle, the image data representing a portion of an environment in which the vehicle is operating. For instance, the received image data may have been captured by an image sensor of the sensor system(s) 206 of the vehicle 202.

At operation 804, the method 800 includes inputting the image data into a machine-learned model that is configured to determine one or more key points associated with one or more objects in the environment. For instance, the image data may be input into one or more of the machine-learned model(s) 230 stored in the memory 218 of the vehicle computing device(s) 204 of the vehicle 202. Additionally, or alternatively, the image data may be input into one or more of the machine-learned model(s) 244 stored in the memory 238 of the computing device(s) 234 that are remote from and accessible to the vehicle 202 via the one or more network(s) 232.

At operation 806, the method 800 includes receiving an output from the machine-learned model. For instance, the output may be received from the one or more machine-learned model(s) 230 or the one or more machine-learned model(s) 244. At operation 808, the method 800 includes determining whether the output includes one or more key points. The key points may correspond to objects in the environment, including pedestrians. For instance, the vehicle computing device(s) 204 and/or another machine-learned model of the one or more machine-learned models 230 and/or 244 may determine whether the output includes one or more key points.

If, at operation 808, it is determined that the output does not include any key points, the method 800 may proceed to operation 810, which includes performing a first action. For instance, the first action may comprise sending an indication to the planning component 224 of the vehicle 202 that no objects were detected in the environment. From operation 810 the method 800 may proceed to operation 818, discussed below.

Conversely, if it is determined at operation 808 that the output does include one or more key points, the method 800 may proceed to operation 812, which includes determining whether any of the one or more key points correspond with one or more pedestrians. For instance, the vehicle computing device(s) 204 and/or another machine-learned model of the one or more machine-learned models 230 and/or 244 may determine whether any of the one or more key points correspond with one or more pedestrians.

If, at operation 812, it is determined that none of the key points correspond with pedestrians, the method 800 may proceed to operation 814, which includes performing a second action. For instance, the second action may include sending an indication to the planning component 224 of the vehicle 202 of detected objects in the environment based on the key points, but that the key points do not correspond to pedestrians. From operation 814, the method 800 proceeds to operation 818, which is discussed in further detail below.

Conversely, if it is determined at operation 812 that one or more of the key points do correspond with one or more pedestrians, the method 800 may proceed to operation 816, which includes determining a bounding box associated with a first pedestrian, the bounding box indicating that the first pedestrian is in the environment. For instance, the vehicle computing device(s) 204 and/or another machine-learned model of the one or more machine-learned models 230 and/or 244 may determine the bounding box. In some instances, determining the bounding box may be based at least in part on receiving the one or more key points corresponding with the one or more pedestrians. Additionally, the bounding box may encompass a first group of key points of the one or more key points that correspond with the first pedestrian.

At operation 818, the method 800 includes controlling the vehicle based at least in part on at least one of the first action, the second action, or the bounding box. For instance, the planning component 224 of the vehicle 202 may determine a driving instruction or a trajectory for the vehicle 202 to follow based at least in part on the first action, the second action, or the bounding box. Additionally, in some examples, the vehicle 202 may be controlled based on an arrangement of the one or more key points corresponding with the one or more pedestrians. For instance, an arrangement of the key points corresponding with a pedestrian may indicate a pose of the pedestrian, a predicted future behavior of the pedestrian, a velocity and/or direction of travel of the pedestrian, a predicted future location of the pedestrian, and/or the like that may be used by, for instance, the planning component 224 to control the vehicle 202.

EXAMPLE CLAUSES

A. A system comprising: one or more processors; and one or more non-transitory computer-readable media storing instructions that, when executed by the one or more processors, cause the system to perform operations comprising: receiving image data captured by an image sensor of a vehicle, the image data representing a portion of an environment in which the vehicle is operating; determining a first bounding box associated with a first pedestrian detected in the image data; determining, based at least in part on the first bounding box and the image data, first key points corresponding to physical features of the first pedestrian; inputting the image data into a machine-learned model;

receiving an output from the machine-learned model, the output including second key points corresponding to physical features of a second pedestrian in the environment; determining, based at least in part on the second key points, a second bounding box associated with the second pedestrian, the second bounding box encompassing the second key points, the second bounding box indicating that the second pedestrian is in the environment; and controlling the vehicle based at least in part on the first bounding box and the second bounding box.

B. The system as recited in paragraph A, wherein the second pedestrian is not detected in the image data prior to receiving the output form the machine-learned model including the second key points.

C. The system as recited in any of paragraphs A-B, wherein the physical features comprise one or more of a hand, a wrist, an elbow, a shoulder, a hip, a knee, an ankle, a foot, an eye, a nose, or an ear.

D. The system as recited in any of paragraphs A-C, the operations further comprising determining, based at least in part on an arrangement of the second key points, at least one of a predicted pose of the second pedestrian or a predicted future location of the second pedestrian, wherein controlling the vehicle is further based at least in part on the predicted pose or the predicted future location.

E. The system as recited in any of paragraphs A-D, wherein the output further includes a confidence score associated with the second key points, the confidence score representing one or more of a first probability that the second key points are associated with the second pedestrian; a second probability that an individual key point of the second key points corresponds to a first physical feature of the second pedestrian; or a third probability that a predicted key point of the second key points corresponds to an occluded physical feature of the second pedestrian.

F. A method comprising: receiving sensor data from a sensor associated with a vehicle in an environment; inputting the sensor data into a machine-learned model; receiving, from the machine-learned model, a first key point associated with a first physical feature of an object in the environment; determining, based at least in part on the first key point, a bounding box associated with the object; and controlling the vehicle based at least in part on at least one of the first key point or the bounding box.

G. The method as recited in paragraph F, wherein the object is a pedestrian and the first key point is part of a group of key points associated with the pedestrian and received from the machine-learned model, wherein an individual key point of the group of key points is associated with a respective physical feature of the pedestrian.

H. The method as recited in any of paragraphs F-G, wherein the object is a pedestrian and the first physical feature is one of a hand, a wrist, an elbow, a shoulder, a hip, a knee, an ankle, a foot, an eye, a nose, or an ear of the pedestrian.

I. The method as recited in any of paragraphs F-H, further comprising determining a predicted pose of the object based at least in part on the first key point, wherein controlling the vehicle is further based at least in part on the predicted pose.

J. The method as recited in any of paragraphs F-I, further comprising determining a predicted future location of the object based at least in part on the first key point, wherein controlling the vehicle is further based at least in part on the predicted future location.

K. The method as recited in any of paragraphs F-J, wherein the object is a pedestrian and the first physical feature of the pedestrian is visible in the sensor data, the method further comprising receiving, from the machine-learned model, a second key point associated with a second physical feature of the pedestrian, the second physical feature occluded in the sensor data by another object in the environment.

L. The method as recited in any of paragraphs F-K, further comprising receiving, from the machine-learned model, multiple key points associated with the object and multiple links connecting the multiple key points, the multiple key points including the first key point, a second key point, and a third key point, wherein: a first link of the multiple links connects the first key point to the second key point, and a second link of the multiple links connects the second key point to the third key point.

M. The method as recited in any of paragraphs F-L, wherein the first key point received from the machine-learned model includes an indication that the first physical feature of the object is occluded from the sensor.

N. The method as recited in any of paragraphs F-M, further comprising receiving, from the machine-learned model, an indication of a probability that the first key point corresponds to the first physical feature of the object.

O. The method as recited in any of paragraphs F-N, wherein the object is a first object, the method further comprising receiving, from the machine-learned model and based at least in part on the sensor data, a second key point that is associated with a second object in the environment.

P. One or more non-transitory computer-readable media storing instructions that, when executed by one or more processors, cause the one or more processors to perform operations comprising: receiving sensor data from a sensor associated with a vehicle in an environment; inputting the sensor data into a machine-learned model; receiving, from the machine-learned model, a first key point associated with a first physical feature of an object in the environment; determining, based at least in part on the first key point, a bounding box associated with the object; and controlling the vehicle based at least in part on at least one of the first key point or the bounding box.

Q. The one or more non-transitory computer-readable media as recited in paragraph P, wherein the object is a pedestrian and the first key point is part of a group of key points associated with the pedestrian and received from the machine-learned model, wherein an individual key point of the group of key points is associated with a respective physical feature of the pedestrian.

R. The one or more non-transitory computer-readable media as recited in any of paragraphs P-Q, wherein the object is a pedestrian and the first physical feature is one of a hand, a wrist, an elbow, a shoulder, a hip, a knee, an ankle, a foot, an eye, a nose, or an ear of the pedestrian.

S. The one or more non-transitory computer-readable media as recited in any of paragraphs P-R, the operations further comprising determining a predicted pose of the object based at least in part on the first key point, wherein controlling the vehicle is further based at least in part on the predicted pose.

T. The one or more non-transitory computer-readable media as recited in any of paragraphs P-S, the operations further comprising determining a predicted future location of the object based at least in part on the first key point, wherein controlling the vehicle is further based at least in part on the predicted future location.

U. One or more non-transitory computer-readable media storing instructions that, when executed by one or more processors, cause the one or more processors to perform operations comprising: receiving sensor data representing a portion of an environment in which a vehicle is operating; receiving a key point corresponding to a physical feature of a pedestrian in the environment; inputting the sensor data into a machine-learned model; receiving an output from the machine-learned model, the output including a predicted key point corresponding to the physical feature of the pedestrian; determining a difference between the key point and the predicted key point; and based at least in part on the difference, altering a parameter of the machine-learned model to minimize the difference to obtain a trained machine-learned model that is configured to determine the key point corresponding to the physical feature of the pedestrian.

V. The one or more non-transitory computer-readable media as recited in paragraph U, wherein the physical feature comprises one or more of a hand, an elbow, a shoulder, a hip, a knee, an ankle, a foot, an eye, a nose, or an ear.

W. The one or more non-transitory computer-readable media as recited in any of paragraphs U-V, wherein the key point is associated with a three-dimensional (3D) space and the predicted key point is associated with a two-dimensional (2D) space.

X. The one or more non-transitory computer-readable media as recited in any of paragraphs U-W, The non-transitory computer-readable media of claim 15, wherein the sensor data is image data captured by an image sensor of the vehicle, and wherein the image data includes a bounding box associated with the pedestrian.

Y. The non-transitory computer-readable media as recited in any of paragraphs U-X, the operations further comprising: inputting the sensor data into the trained machine-learned model; and receiving, from the trained machine-learned model, the key point corresponding to the physical feature of the pedestrian.

Z. The non-transitory computer-readable media as recited in any of paragraphs U-Y, wherein the machine learned model is at least one of a neural network, a convolutional neural network, or a recurrent neural network.

While the example clauses described above are described with respect to one particular implementation, it should be understood that, in the context of this document, the content of the example clauses may also be implemented via a method, device, system, computer-readable medium, and/or another implementation. Additionally, any of examples A-Z may be implemented alone or in combination with any other one or more of the examples A-Z.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions that, when executed by the one or more processors, cause the system to perform operations comprising:
receiving image data captured by an image sensor of a vehicle, the image data representing a portion of an environment in which the vehicle is operating;
determining a first bounding box associated with a first pedestrian detected in the image data;
determining, based at least in part on the first bounding box and the image data, first key points corresponding to physical features of the first pedestrian;
inputting the image data into a machine-learned model;
receiving an output from the machine-learned model, the output including second key points corresponding to physical features of a second pedestrian in the environment;
determining, based at least in part on the second key points, a second bounding box associated with the second pedestrian, the second bounding box encompassing the second key points, the second bounding box indicating that the second pedestrian is in the environment; and
controlling the vehicle based at least in part on the first bounding box and the second bounding box.

2. The system of claim 1, wherein the second pedestrian is not detected in the image data prior to receiving the output from the machine-learned model including the second key points.

3. The system of claim 1, wherein the physical features comprise one or more of a hand, a wrist, an elbow, a shoulder, a hip, a knee, an ankle, a foot, an eye, a nose, or an ear.

4. The system of claim 1, the operations further comprising determining, based at least in part on an arrangement of the second key points, at least one of a predicted pose of the second pedestrian or a predicted future location of the second pedestrian, wherein controlling the vehicle is further based at least in part on the predicted pose or the predicted future location.

5. The system of claim 1, wherein the output further includes a confidence score associated with the second key points, the confidence score representing one or more of:
a first probability that the second key points are associated with the second pedestrian;
a second probability that an individual key point of the second key points corresponds to a first physical feature of the second pedestrian; or
a third probability that a predicted key point of the second key points corresponds to an occluded physical feature of the second pedestrian.

6. A method comprising:
receiving sensor data from a sensor associated with a vehicle in an environment;
inputting the sensor data into a machine-learned model;
receiving, from the machine-learned model, a first key point associated with a first physical feature of an object in the environment;

determining, based at least in part on the first key point, a bounding box associated with the object; and controlling the vehicle based at least in part on at least one of the first key point or the bounding box.

7. The method of claim 6, wherein the object is a pedestrian and the first key point is part of a group of key points associated with the pedestrian and received from the machine-learned model, wherein an individual key point of the group of key points is associated with a respective physical feature of the pedestrian.

8. The method of claim 6, wherein the object is a pedestrian and the first physical feature is one of a hand, a wrist, an elbow, a shoulder, a hip, a knee, an ankle, a foot, an eye, a nose, or an ear of the pedestrian.

9. The method of claim 6, further comprising determining a predicted pose of the object based at least in part on the first key point, wherein controlling the vehicle is further based at least in part on the predicted pose.

10. The method of claim 6, further comprising determining a predicted future location of the object based at least in part on the first key point, wherein controlling the vehicle is further based at least in part on the predicted future location.

11. The method of claim 6, wherein the object is a pedestrian and the first physical feature of the pedestrian is visible in the sensor data, the method further comprising receiving, from the machine-learned model, a second key point associated with a second physical feature of the pedestrian, the second physical feature occluded in the sensor data by another object in the environment.

12. The method of claim 6, further comprising receiving, from the machine-learned model, multiple key points associated with the object and multiple links connecting the multiple key points, the multiple key points including the first key point, a second key point, and a third key point, wherein:

a first link of the multiple links connects the first key point to the second key point, and a second link of the multiple links connects the second key point to the third key point.

13. The method of claim 6, wherein the first key point received from the machine-learned model includes an indication that the first physical feature of the object is occluded from the sensor.

14. The method of claim 6, further comprising receiving, from the machine-learned model, an indication of a probability that the first key point corresponds to the first physical feature of the object.

15. The method of claim 6, wherein the object is a first object, the method further comprising receiving, from the machine-learned model and based at least in part on the sensor data, a second key point that is associated with a second object in the environment.

16. One or more non-transitory computer-readable media storing instructions that, when executed by one or more processors, cause the one or more processors to perform operations comprising:

receiving sensor data from a sensor associated with a vehicle in an environment;

inputting the sensor data into a machine-learned model;

receiving, from the machine-learned model, a first key point associated with a first physical feature of an object in the environment;

determining, based at least in part on the first key point, a bounding box associated with the object; and controlling the vehicle based at least in part on at least one of the first key point or the bounding box.

17. The one or more non-transitory computer-readable media of claim 16, wherein the object is a pedestrian and the first key point is part of a group of key points associated with the pedestrian and received from the machine-learned model, wherein an individual key point of the group of key points is associated with a respective physical feature of the pedestrian.

18. The one or more non-transitory computer-readable media of claim 16, wherein the object is a pedestrian and the first physical feature is one of a hand, a wrist, an elbow, a shoulder, a hip, a knee, an ankle, a foot, an eye, a nose, or an ear of the pedestrian.

19. The one or more non-transitory computer-readable media of claim 16, the operations further comprising determining a predicted pose of the object based at least in part on the first key point, wherein controlling the vehicle is further based at least in part on the predicted pose.

20. The one or more non-transitory computer-readable media of claim 16, the operations further comprising determining a predicted future location of the object based at least in part on the first key point, wherein controlling the vehicle is further based at least in part on the predicted future location.

* * * * *